United States Patent [19]
Beckwith et al.

[11] 3,849,218
[45] Nov. 19, 1974

[54] COMPOSITION AND METHOD FOR STRIPPING NICKEL, ZINC AND CADMIUM FROM SUBSTRATES OF IRON AND COPPER

[75] Inventors: Merton M. Beckwith, Rockville; Jaan-Jiue Fong, Tolland, both of Conn.

[73] Assignee: Conversion Chemical Corporation, Rockville, Conn.

[22] Filed: Mar. 13, 1973

[21] Appl. No.: 340,911

[52] U.S. Cl. ................ 156/18, 252/79.4, 252/79.5
[51] Int. Cl. ......................... C09k 3/00, C23f 1/00
[58] Field of Search ....... 75/97, 103, 119, 120, 121; 252/79.1–79.5; 156/18; 134/41

[56] References Cited
UNITED STATES PATENTS

| | | | |
|---|---|---|---|
| 2,649,361 | 8/1953 | Springer et al. | 156/18 X |
| 3,365,401 | 1/1968 | Saubestre et al. | 156/18 X |
| 3,460,938 | 8/1969 | Grunwald et al. | 75/97 |
| 3,669,776 | 1/1972 | Eppensteiner | 156/18 |
| 3,717,520 | 2/1973 | Brindisi | 252/79.5 X |

*Primary Examiner*—William A. Powell

[57] ABSTRACT

A composition for selectively stripping a coating of nickel, cadmium and zinc from a workpiece providing a substrate surface of iron, copper and alloys thereof comprises an aqueous solution of a water-soluble nitrobenzoic acid compound, a water-soluble carbonate compound, a water-soluble thiosulfuric acid compound, a water-soluble dithiocarbamate compound and ammonium hydroxide in a quantity sufficient to provide a pH of about 8.5 to 10.7. A process utilizing the stripper composition is operable at ambient to elevated temperatures and provides a desirable balance of rapidity and uniformity of stripping rate.

17 Claims, No Drawings

COMPOSITION AND METHOD FOR STRIPPING NICKEL, ZINC AND CADMIUM FROM SUBSTRATES OF IRON AND COPPER

BACKGROUND OF THE INVENTION

Various compositions have been proposed for stripping coatings of nickel, cadmium or zinc from workpieces of other metal onto which the coatings have been deposited by electroplating techniques. Frequently it is found that there will be some imperfection in the electrodeposit, such as discoloration or power adhesion which will require the removal of the coating so that a more satisfactory deposit can be obtained. It is quite common to plate nickel, cadmium and zinc upon substrates of iron or its alloys and copper or its alloys, and these metals are particularly susceptible to attack by some of the etchants which would operate effectively upon the nickel, cadmium or zinc. Mechanical stripping of such coatings is generally uneconomical and thus, the emphasis has been for the use of chemical compositions, albeit with certain defects.

In Weisberg U.S. Pat. No. 3,102,808 granted Sept. 3, 1963 and U.S. Pat. No. 3,160,524 granted Dec. 29, 1964 there are disclosed compositions for the stripping of cadmium and nickel from underlying metal substrates. The compositions of these patents have proven quite effective and have afforded significant commercial advantages.

However, some difficulties have remained with respect to obtaining a stripped workpiece which would be susceptible to rapid cleaning and also in obtaining a relatively uniform rate of stripping over a significant portion of the life of the stripping solution. In some instances an inherent black film resulting from the use of some of the Weisberg compositions has been more difficult to remove even with hydrochloric acid as a subsequent dip.

Accordingly, it is an object of the present invention to provide a novel composition and process for selectively stripping nickel, cadmium, and zinc coatings from workpieces providing substrate surfaces of iron, copper or alloys thereof.

It is also an object to provide such a composition and process which is operable at a relatively constant stripping rate over a significant portion of the useful life of the composition.

Another object is to provide such a composition and process wherein the formation of surface film is minimized and the film is readily removed by treatment in hydrochloric acid or sulfuric acid.

Still another object is to provide such a composition and process wherein the stripping activity may be maintained conveniently by the addition of ammonium hydroxide.

SUMMARY OF THE INVENTION

It has now been found that the foregoing and related objects may be readily attained by selectively stripping nickel, cadmium and zinc coatings from a workpiece providing a substrate surface of iron or copper, or alloys of iron or copper, by use of a composition which comprises an aqueous solution of various water-soluble compounds. On a per liter basis at makeup the solution comprises about 20 to 80 grams of a water-soluble nitrobenzoic acid compound selected from the group consisting of nitrobenzoic acid, ring-substituted nitrobenzoic acid, the ammonium and alkali metal salts thereof, and mixtures thereof, and about 40 to 160 grams of a water-soluble carbonate compound selected from the group consisting of carbonic acid, the ammonium and alkali metal salts thereof, and mixtures thereof. Also included are about 0.2 to 8.0 grams of a water-soluble dithiocarbamate (substituted or unsubstituted) compound selected from the group consisting of thiocarbamic acids and the alkali metal and ammonium salts thereof, and about 0.2 to 16.0 grams of a water-soluble thiosulfuric acid compound selected from the group consisting of thiosulfuric acid, the alkali metal and ammonium salts thereof, and mixtures thereof. Ammonium hydroxide is added in a quantity sufficient to provide a solution pH of about 8.5 to 10.7. The composition has a weight ratio of ammonium ion ($NH_4^+$) to nitrobenzoic acid radical ($NO_2C_6H_4COO^-$) of about 1.0 – 3.0:1.0, a weight ratio of thiosulfuric acid radical ($S_2O_3^=$) to dithiocarbamate radical (($(C_2H_5)_2NSCS^-$)) of about 0.2 – 8.0:1.0 and a weight ratio of dithiocarbamate and thiosulfuric acid radicals combined to nitrobenzoic acid radical of about 0.01 – 0.70:1.0.

Normally the dithiocarbamate compound will be a diethyldithiocarbamate salt. In the preferred compositions the nitrobenzoic acid compound will be ammonium nitrobenzoate, the carbonate compound will be ammonium bicarbonate, the dithiocarbamate compound will be sodium diethyldithiocarbamate and the thiosulfuric acid compound will be sodium thiosulfate.

Desirably the solution contains about 30 to 60 grams of nitrobenzoic acid compound, about 60 to 120 grams of carbonate compound, about 0.3 to 4.0 grams of dithiocarbamate compound, about 0.5 to 8.0 grams of thiosulfuric acid compound and ammonium hydroxide in a quantity sufficient to provide a pH of at least 9.0. The optimum compositions will contain about 35 to 45 grams of nitrobenzoic acid, about 70 to 90 grams of ammonium bicarbonate, about 0.7 to 1.3 gram of sodium diethyldithiocarbamate, about 1.0 to 3.0 grams of sodium thiosulfate and sufficient ammonium hydroxide to maintain a pH of about 9.0 to 9.8.

The pH is normally maintained in the range of about 9.0 to 9.5 and the weight ratio of ammonium ion to nitrobenzoic acid radical is about 1.5 – 2.5:1.0. The weight ratio of thiosulfate radical to dithiocarbamate radical is about 1.1 – 3.5:1.0 and the weight ratio of dithiocarbamate and thiosulfate radicals combined to nitrobenzoic acid radical is about 0.05 – 0.4:1.0.

In the method of the present invention, the bath is maintained at a temperature of 20° to 60° C. and there is immersed therein a workpiece having a substrate with a surface of a metal selected from the group consisting of iron, copper, copper alloys and iron alloys and a coating on at least a portion of the surface thereof of a metal selected from the group consisting of nickel, zinc, cadmium, nickel alloys, zinc alloys and cadmium alloys, for a period of time sufficient to strip said coating from said surface. Following stripping of the coating, the workpiece is removed from the bath and its surface is rinsed.

In the preferred aspect of the present invention, ammonium hydroxide is added periodically or continuously to maintain the pH within the desired range which preferably is about 9.0 to 9.8. The bath desirably is operated at a temperature of 35° to 50° C. and the workpiece will be immersed in a hydrochloric acid solution to remove the black film formed thereon.

DESCRIPTION OF THE PREFERRED EMBODIMENTS

The baths of the present invention comprise an aqueous solution of the water-soluble nitrobenzoic acid compound, a water-soluble carbonate compound, a water-soluble dithiocarbamate compound, a water-soluble thiosulfuric acid compound and ammonium hydroxide. They are operable over a range of pH and at a range of temperatures, and the various compounds enumerated above will normally be present after adjustment of pH as the alkali metal or ammonium salt, as will be explained more fully hereinafter.

Various water-soluble nitrobenzoic acid compoumds may be employed, including nitrobenzoic acid, ring-substituted nitrobenzoic acids, such as dinitrobenzoic acid and chloronitrobenzoic acid, the ammonium and alkali metal salts, and mixtures of the salts and acids. The location of the nitro-substituenton the ring is relative to the carboxyl group is not critical and ortho-, meta- and paranitrobenzoic acid compounds have been satisfactorily utilized. The preferred compositions utilize nitrobenzoic acid or ammonium nitrobenzoate at makeup, the former being converted to ammonium nitrobenzoate in the presence of the excess of ammonium ions in the alkaline solution. Generally, the nitrobenzoic acid compound is present in an amount of 20 to 80 grams per liter and preferably about 30 to 60 grams per liter. Highly effective commercial compositions have been prepared utilizing 35 to 45 grams per liter.

The water-soluble carbonate compound may be prepared at makeup from carbonic acid (usually provided by the introduction of carbon dioxide gas), the ammonium and alkali metal salts thereof and mixtures of the several salts. As will be appreciated carbonic acid is immediately converted into a carbonate salt in the presence of the excess ammonium ion at the alkaline pH maintained for the solutions of the present invention. At the operable pH, the carbonate compound will normally be a bicarbonate and accordingly, it is preferred to add the carbonate compound as an ammonium or alkali metal bicarbonate. The range of concentration may vary from 40 to 160 grams per liter with the preferred compositions employing from about 60 to 120 grams per liter. Highly desirable commercial formulations have employed 70 to 90 grams per liter.

Although dithiocarbamic acid and its alkali metal and ammonium salts may be employed to provide the dithiocarbamate compound, it is preferable to use the mono- and di- N-substituted dithiocarbamic acids and their salts. The substituents on the amine group comprise alkyl groups of 1 – 6 carbon atoms with 2 – 3 carbon atoms being preferred. Of the various compounds, diethyl dithiocarbamate salts have been proven particularly advantageous in commercial formulations and such salts have included disodium and diammonium ethylene-bis (dithiocarbamate) and sodium diethyl dithiocarbamate. The amount of the dithiocarbamate compound may vary from 0.2 to 8.0 grams per liter and is preferably 0.3 – 4.0 grams per liter. Highly effective commercial formulations have been prepared using 0.7 – 1.3 grams per liter of the diethyl dithiocarbamate salts.

As indicated above, the thiosulfuric acid compound may be provided by adding thiosulfuric acid which will be immediately converted into a salt upon adjustment of pH and in the presence of the excess of ammonium ion. Accordingly, it is preferable to add the thiosulfuric acid compound as either the alkali metal or ammonium salt or as a mixture thereof, with the ammonium salts being preferred since the ammonium ion is a necessary component of the composition. The thiosulfuric acid will normally be present in a range of 0.2 – 16 grams per liter and preferably about 0.5 – 8.0 grams per liter. Highly effective commercial formulations have been prepared using 1.0 – 3.0 grams per liter of thiosulfurate salts.

The ammonium hydroxide required in the composition may be generated by bubbling anhydrous ammonia through the water utilized to prepare the formulation or it may be added as an aqueous solution of ammonium hydroxide. It will be necessary to generate or add sufficient ammonium hydroxide to provide a solution pH of 8.5 – 10.7 and preferably about 9.0 to 10.0. The most desirable formulations utilize a pH of 9.0 to 9.5. In addition, the ammonium ion ($NH_4^+$) must provide a weight ratio of ammonium ion to nitrobenzoic acid radical ($NO_2C_6H_4COO$) of 1.0 – 3.0 and preferably about 1.5 – 2.5.

Similarly, the weight ratio of thiosulfuric acid radical ($S_2O_3^=$) to dithiocarbamate radical determined as the diethyl dithiocarbamate (($(C_2H_5)_2NSCS^-$)) may vary over the range of 0.2 – 8.0:1 with the preferred ratio being 1.1 – 3.5:1. The weight ratio of the dithiocarbamate and thiosulfuric acid radicals combined to the nitrobenzoic acid radical may vary within the range of about 0.01 – 0.7:1 and preferably about 0.05 – 0.4:1. Variations of the weight ratio of dithiocarbamate and thiosulfuric acid radicals relative to the nitrobenzoic acid radical have been found to have a significant effect on the balance desired between the rate of stripping and the effective life of the composition as well as the possibility of attack upon the workpiece. As one approaches the lower end of the range, the stripping rate decreases and as one approaches the upper end of the range, there is a tendency to attack the surface of the substrate, particularly if that substrate surface is copper or its alloys.

As will be appreciated, the required ammonium ion will be provided by ammonium hydroxide and by any ammonium salts which are utilized to provide the active components. As indicated above, preferably the ammonium salts are employed where economically available so as to avoid the introduction of other unnecessary ions and to minimize the amount of ammonium hydroxide required to establish the required pH.

The theory of operation is not completely understood. As indicated in the aforementioned Weisberg patents, the thiosulfate ion would appear to have the effect of increasing the stripping rate within certain limits of concentration. The dithiocarbamate has the effect of decreasing the stripping rate but it serves a very useful purpose in balancing the rate of stripping with uniformity of stripping over a significant portion of the useful life and it further minimizes the formation of and the tenacity of a black film on the surface of the metal workpiece. If no dithiocarbamate is present, this black film is so tenacious that it is almost impossible to remove even in the hydrochloric acid dip or rinse employed subsequent to the stripping bath. With the addition of dithiocarbamates in the range set forth herein, the tenacity of the film and its thickness are both materially reduced and the film is readily removable in a dip or rinse of hydrochloric acid following stripping, thus producing a stripped workpiece available for immediate processing.

The stripping compositions are normally operated at a temperature of about 20° to 60° C. and preferably at about 35° to 55° C. However, it is also possible to use ambient and even lower temperatures if longer stripping times are acceptable. Agitation is desirable either of the workpieces or the solution. Generally, at the preferred elevated temperature of 35° to 55° C., the stripping rate of nickel metal will be about 1 mil per hour, whereas at ambient temperatures the stripping rate will be about 0.3 mil per hour.

The workpieces will normally be fabricated of copper or iron, iron alloys or copper alloys in their entirety although the stripping composition can also be utilized upon composites of such metals with other metals so long as those metals are protected from attack by the stripping composition. Although spray treatment is effective to remove the metal coatings, the preferred procedures involve immersing of the workpiece in the stripping composition.

In order to maintain the desired pH and the effectiveness of the composition, it is desirable to add ammonium hydroxide or anhydrous ammonia during the course of operation. This can be done on an automatic basis or on a periodic basis as desired. The intermittent or continuous addition of ammonium hydroxide or anhydrous ammonia substantially prolongs the useful life of the stripping solution and tends to maintain its uniformity of etch rate.

The following is the formulation of a stripping composition which has proven highly effective in various commercial applications:

| Ingredient | Range | Preferred |
| --- | --- | --- |
| Nitrobenzoic Acid | 35–45 grams | 40 grams |
| Ammonium Bicarbonate | 70–90 grams | 80 grams |
| Sodium Diethyldithiocarbamate | 0.7–1.3 gram | 1 gram |
| Sodium Thiosulfate | 1.0–3.0 grams | 2 grams |
| Ammonium Hydroxide | to pH 9.0–10.1 | 9.8 |
| Water | to 1 liter | |

In the utilization of the compositions of the present invention, the workpiece is exposed to the stripping composition until the nickel, cadmium of zinc coating is stripped therefrom, at which time the workpiece is removed from contact with the stripping composition. As indicated hereinbefore, a black film forms upon the surface of the workpiece and it is generally necessary to remove this film by subsequent treatment in a hydrochloric acid solution. Alternatively to the use of hydrochloric acid solutions, sulfuric acid solutions may be employed. In either instance the solution desirably is dilute and on the order of about 3–7 percent by volume. Following treatment in the acid rinse, the workpiece should be free of the black film and it is then rinsed in water and dried.

In processing the workpieces in the stripping composition, they should be immersed therein but held above the level of any sludge or contamination which forms at the bottom of the tank. Since the stripping compositions of the present invention are extremely corrosive to many materials, it is desirable to employ for the cross-bars above the tank and other supporting elements materials which are resistant to attack by the stripping composition. In addition, it is necessary to fabricate the tank in which the stripping composition is placed from a material which is resistant to attack. Mild steel and plastics such as polyvinyl chloride have been useful for these purposes. If steel is employed for the cross-bars, it is desirable to insulate the cross-bars from the sides of the tank.

If the stripping rate begins to decrease (which will occur when the solution approaches the end of its useful life), it is desirable to dispose of a volume of the solution in the treating tank and to replace it with an equal volume of fresh stripping solution. As indicated hereinbeforee, the pH should be maintained at the desired level by the addition of anhydrous ammonia or ammonium hydroxide.

Exemplary of the present invention are the following specific examples setting forth the results of various stripping compositions.

EXAMPLE 1

A series of stripping compositions were formulated from various components and in varying amounts as indicated in the table appearing hereinafter. Following the addition of the various other compounds, the pH of each of the several compositions was adjusted to 9.7 by the addition of ammonium hydroxide and the various compositions were then maintained at a temperature of about 49° C., except as otherwise noted.

To test the stripping rate of the various compositions, nickel plated test panels 2.54 centimeters by 8.89 centimeters were weighed and then immersed in the stripping composition for a period of 30 minutes. They were then rinsed in a 5 percent hydrochloric acid solution and rinsed in water. Following drying, they were reweighed to determine the total amount of nickel stripped and this information was then utilized to determine the amount of nickel stripped and the stripping rate in mils thickness per hour.

TABLE

| STRIPPER COMPOSITION AT MAKE-UP TIME, GRAMS PER LITER | SPECIMEN NUMBER | | | | | | | | | | | | |
| --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 |
| NITROBENZOIC ACID | 40 | 40 | 40 | 40 | 40 | 40 | 40 | 40 | 40 | 40 | 40 | 40 | 40 |
| AMMONIUM BICARBONATE | 80 | 80 | 80 | 80 | 80 | 80 | 80 | 80 | 80 | 80 | 80 | 80 | — |
| AMMONIUM CARBONATE | — | — | — | — | — | — | — | — | — | — | — | — | 80 |
| SODIUM DIETHYLDITHIOCARBAMATE | — | 0.25 | 1 | 2 | 4 | 8 | 1 | 1 | 1 | 1 | 1 | 1 | 1 |
| SODIUM THIOSULFATE | 2 | 2 | 2 | 2 | 2 | 2 | — | 0.5 | 2 | 4 | 8 | 16 | 2 |
| pH (ADJUSTED WITH AMMONIUM HYDROXIDE) | 9.7 | 9.7 | 9.7 | 9.7 | 9.7 | 9.7 | 9.7 | 9.7 | 9.7 | 9.7 | 9.7 | 9.7 | 9.7 |
| STRIP RATE, GMS IN 30 MIN. | 0.91 | 0.73 | 0.61 | 0.47 | 0.41 | 0.35 | 0.27 | 0.57 | 0.65 | 0.63 | 0.59 | 0.56 | 0.60 |

TABLE—Continued

| STRIPPER COMPOSITION AT MAKE-UP TIME, GRAMS PER LITER | SPECIMEN NUMBER | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| STRIP RATE MILS/HOUR | 1.82 | 1.46 | 1.22 | 0.94 | 0.82 | 0.70 | 0.54 | 1.14 | 1.30 | 1.26 | 1.18 | 1.12 | 1.20 |

Specimen 1 developed a thick black adherent gelatinous coating which was extremely difficult to remove in the hydrochloric dip. Specimen 2 evidenced such a black coating of lessser thickness and more readily removable. Specimens 3 – 6 had relatively thin black coatings which were readily removed in the hydrochloric acid dip. Thus, the dithiocarbamate salt had the effect of minimizing the formation of the black film or coating and facilitating its removal.

As can be seen from Specimens 7 – 12, the addition of the thiosulfate salt significantly improves the etch rate but amounts above 4 grams per liter have no increasing effect and serve no useful purpose.

Within the preferred range of composition, the etch rate tends to be relatively constant over extended periods of usage. Indicative of this effect is Specimen 13 wherein the results of the first 30 minute interval of immersion are set forth in the table. This specimen was returned to the bath for a further 30 minute period during which its weight loss was 0.58 grams, evidencing a strip rate of 1.16 mils per hour.

EXAMPLE 2

Zinc plated panels are immersed in the compositions designated by the numerals 3, 9 and 13 in the foregoing table. The zinc plating is readily removed.

EXAMPLE 3

Cadmium plated panels are immersed in the compositions designated by the numerals 3, 9 and 13 in the foregoing table. The cadmium plating is readily removed.

Thus, it can be seen from the foregoing detailed specification and examples that the present invention provides a highly effective composition process for selectively stripping nickel, cadmium and zinc and alloys thereof from workpieces providing substrate surfaces of iron, copper or alloys thereof. The composition is operable at a relatively constant stripping rate over a significant portion of its useful life and the surface film formed upon the workpieces is minimized and readily removed by treatment in hydrochloric acid or sulfuric acid. The useful life of the stripping compositions may be prolonged by the addition of ammonium hydroxide to maintain the desired pH either as aqueous ammonium hydroxide or as anhydrous ammonia.

Having thus described the invention, we claim:

1. A composition for selectively stripping nickel, cadmium and zinc coatings from a workpiece providing a substrate surface of iron, copper or alloys of iron or copper comprising, on a per liter basis at makeup, an aqueous solution of:
   A. about 20 to 80 grams of a water-soluble nitrobenzoic acid compound selected from the group consisting of nitrobenzoic acid, ring-substituted nitrobenzoic acid, the ammonium and alkali metal salts thereof, and mixtures thereof;
   B. about 40 to 160 grams of a water-soluble carbonate compound selected from the group consisting of carbonic acid, the ammonium and alkali metal salts thereof, and mixture thereof;
   C. about 0.2 to 8.0 grams of a water soluble dithiocarbamate compound selected from the group consisting of substituted and unsubstituted thiocarbamic acids, the alkali metal and ammonium salts thereof, and mixtures thereof;
   D. about 0.2 to 16.0 grams of a water-soluble thiosulfuric acid compound selected from the group consisting of thiosulfuric acid, the alkali metal and ammonium salts thereof, and mixtures thereof;
   E. ammonium hydroxide in a quantity sufficient to provide a solution pH of about 8.5 to 10.7;
   said composition having a weight of ammonium ion ($NH_4^+$) to nitrobenzoic acid radical ($NO_2C_6H_4COO^-$) of about 1.0 – 3.0:1.0, a weight ratio of thiosulfuric acid radical ($S_2O_3^=$) to dithiocarbamate radical ($(C_2H_5)_2NSCS^-$) of about 0.2 – 8.0:1.0 and a weight ratio of dithiocarbamate and thiosulfuric acid radicals combined to nitrobenzoic acid radical of about 0.01 – 0.70:1.0.

2. The composition of claim 1 wherein said dithiocarbamate compound is a diethyldithiocarbamate salt.

3. The composition of claim 2 wherein said nitrobenzoic acid compound is ammonium nitrobenzoic, said carbonate compound is ammonium bicarbonate, said dithiocarbamate compound is sodium diethyldithiocarbamate and said thiosulfuric acid compound is sodium thiosulfate.

4. The composition of claim 1 wherein said solution includes about 30 to 60 grams of said nitrobenzoic acid compound, about 60 to 120 grams of said carbonate compound, about 0.3 to 4.0 grams of said dithiocarbamate compound, about 0.5 to 8.0 grams of said thiosulfuric acid compound and said ammonium hydroxide in a quantity sufficient to provide a pH of at least 9.0.

5. The composition of claim 3 wherein said solution includes about 35 to 45 grams of nitrobenzoic acid, about 70 to 90 grams of said ammonium bicarbonate, about 0.7 to 1.3 gram of sodium diethyldithiocarbamate, about 1.0 to 3.0 grams of sodium thiosulfate and sufficient ammonium hydroxide to maintain a pH of about 9.0 to 9.8.

6. The composition of claim 1 wherein said ammonium hydroxide is preseent in a quantity sufficient to provide a pH of 9.0 to 9.8.

7. The composition of claim 1 wherein said composition has a weight ratio of ammonium ion to nitrobenzoic acid radical of about 1.5 – 2.5:1.0, a weight ratio of thiosulfate radical to dithiocarbamate radical of about 1.1 – 3.5:1.0, and a weight ratio of dithiocarbamate and thiosulfate radicals combined to nitrobenzoic acid radical of about 0.05 – 0.4:1.0.

8. A method for selectively stripping nickel, cadmium and zinc coatings from a workpiece providing a substrate surface of iron, copper or alloys of iron or copper comprising the steps of:
   A. preparing on a per liter basis at makeup an aqueous bath comprising about 20 to 80 grams of a water-soluble nitrobenzoic acid compound selected from the group consisting of nitrobenzoic acid, ring-substituted nitrobenzoic acid, the ammonium and alkali metal salts thereof, and mixtures thereof; about 40 to 160 grams of a water-soluble carbonate compound selected from the group consisting of carbonic acid, the ammonium and alkali metal salts thereof, and mixtures thereof; about 0.2 to 8.0 grams of a water-soluble dithiocarbamate compound selected from the group consisting of substituted and unsubstituted thiocarbamic acids, the alkali metal and ammonium salts thereof and mixtures thereof; aboout 0.2 to 16.0 grams of a water-soluble thiosulfuric acid compound selected from the group consisting of thiosulfuric acid, the alkali metal and ammonium salts thereof, and mixtures thereof; and ammonium hydroxide in a quantity sufficient to provide a solution pH of about 8.5 to 10.7; said bath having a weight ratio of ammonium ion ($NH_4^+$) to nitrobenzoic acid radical ($NO_2C_6H_4COO^-$) of about 1.0 – 3.0:1.0, a weight ratio of thiosulfuric acid radical ($S_2O_3^=$) to dithiocarbamate radical ($(C_2H_5)_2NSCS^-$) of about 1.2 – 8.0:1.0 and a weight ratio of dithiocarbamate and thiosulfuric acid radicals combined to nitrobenzoic acid radical of about 0.01 – 0.70:1.0;

B. maintaining said bath at a temperature of 20° to 60° C.;

C. immersing in said bath a workpiece having a substrate with a surface of a metal selected from the group consisting of iron, copper, copper alloys and iron alloys and a coating on at least a portion of the surface thereof of a metal selected from the group consisting of nickel, zinc and cadmium, for a period of time sufficient to strip said coating from said surface; and D. removing said workpiece from said bath and rinsing the surface thereof.

9. The method in accordance with claim 8 including the additional step of adding ammonium hydroxide to maintain said pH of about 8.5 to 10.7.

10. The method of claim 8 wherein said bath is maintained at a temperature of 35° to 50° C.

11. The method of claim 8 wherein said bath has a pH of about 9.0 to 9.8.

12. The method of claim 8 wherein said workpiece surface is ferrous metal and said coating is nickel.

13. The method of claim 8 wherein said dithiocarbamate compound is a diethyldithiocarbamate salt.

14. The method of claim 13 wherein said nitrobenzoic acid compound is ammonium nitrobenzoate, said carbonate compound is ammonium bicarbonate, said dithiocarbamate compound is sodium diethyldithiocarbamate and said thiosulfuric acid compound is sodium thiosulfate.

15. The method of claim 8 wherein said solution includes about 30 to 60 grams of said nitrobenzoic acid compound, about 60 to 120 grams of said carbonate compound, about 0.3 to 4.0 grams of said dithiocarbamate compound, about 0.5 to 8.0 grams of said thiosulfuric acid compound and said ammonium hydroxide in a quantity sufficient to provide a pH of at least 9.0.

16. The method of claim 8 wherein said composition has a weight ratio of ammonium ion to nitrobenzoic acid radical of about 1.5 – 2.5:1.0, a weight ratio of thiosulfate radical to dithiocarbamate radical of about 1.1 – 3.5:1.0, and a weight ratio of dithiocarbamate and thiosulfate radicals combined to nitrobenzoic acid radical of about 0.05 – 0.4:1.0.

17. The method of claim 8 wherein said workpiece is removed from said bath and rinsed in a hydrochloric acid bath to remove the black film formed thereon.

* * * * *

UNITED STATES PATENT AND TRADEMARK OFFICE
CERTIFICATE OF CORRECTION

PATENT NO. : 3,849,218
DATED : November 19, 1974
INVENTOR(S) : Merton M. Beckwith et al It is certified that error appears in the above-identified patent and that said Letters Patent are hereby corrected as shown below:

Column 1, line 12 should read "poor" instead of "power"

Column 8, line 21 should read "weight ratio of" instead of "weight of"

Column 9, line 19 should read "0.2" instead of "1.2"

Signed and Sealed this twenty-seventh Day of January 1976

[SEAL]

Attest:

RUTH C. MASON
Attesting Officer

C. MARSHALL DANN
Commissioner of Patents and Trademarks